United States Patent Office 3,425,938
Patented Feb. 4, 1969

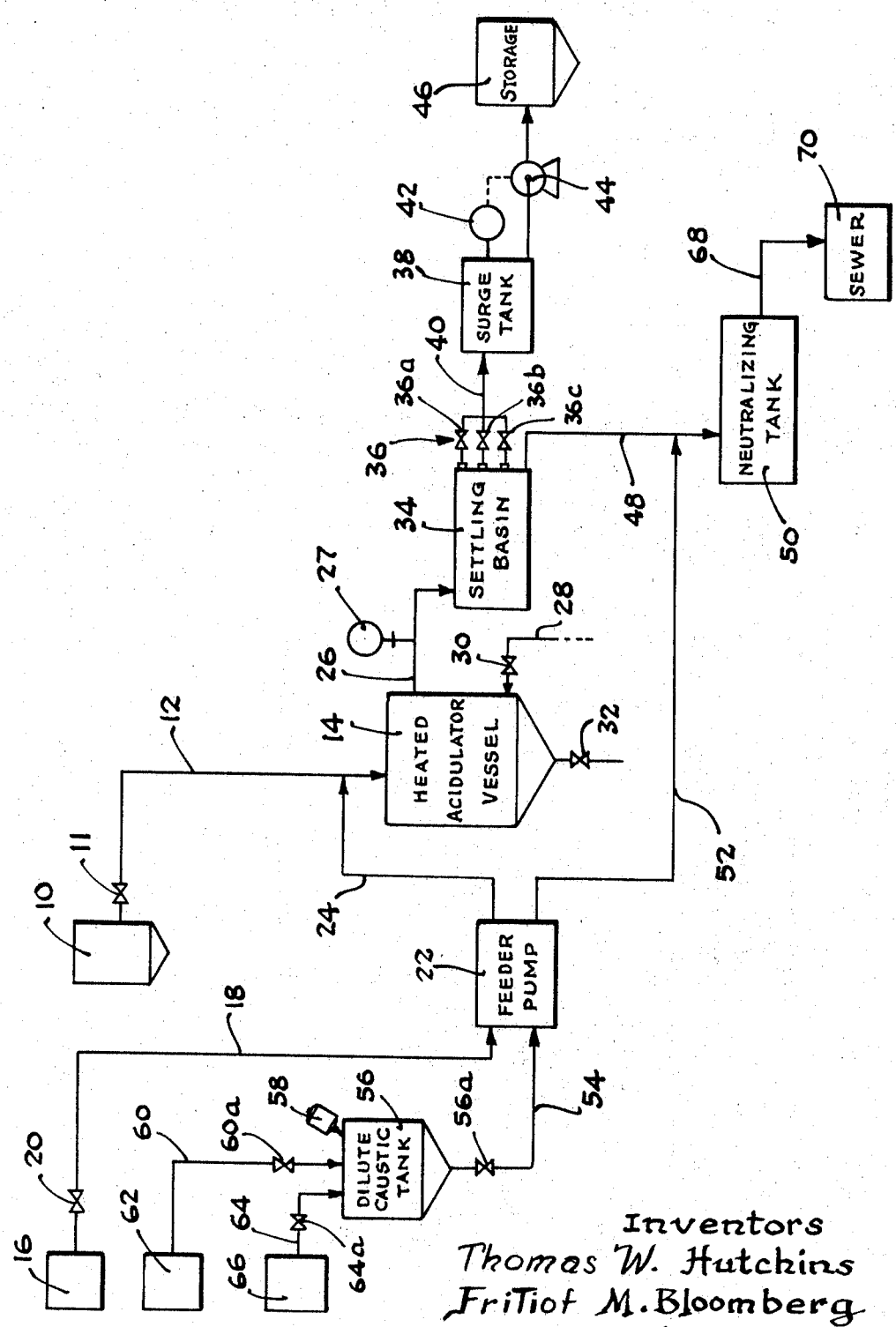

3,425,938
SOAPSTOCK ACIDULATION
Fritiof M. Bloomberg and Thomas W. Hutchins, Stuttgart, Ark., assignors to Arkansas Grain Corporation, Stuttgart, Ark., a corporation of Arkansas
Filed June 9, 1967, Ser. No. 644,907
U.S. Cl. 210—59      13 Claims
Int. Cl. C02c 5/02

ABSTRACT OF THE DISCLOSURE

A method for acidulating soapstock and for collecting the separated acid oil by acidulating a mixture of soapstock, water and mineral acid within a substantially filled and confined or acidulating area; transferring an overflow volume of the acidulated mixture to a confined settling area where the acid oil rises and the acid water settles; withdrawing an overflow volume of the acid oil from the substantially filled settling area to storage means; and said acid water being drained off from the lower portions of the settling area to means where the acid water may be neutralized and then disposed as waste. The method is made continuous by continuously delivering the mixture to the acidulator, and continuously removing the overflow to the settling basin, and then continuously transferring the overflow of acid oil to storage and acid water to the neutralizing means.

An apparatus for practicing the method includes pumping and delivery means to transfer the mixture to a confined acidulator heating vessel, conveying the overflow from an upper overflow port to a settling basin, and then transferring the acid oil as an overflow from an upper overflow port of the settling basin to storage means, while removing the acid water from the lower part of the settling basin through a drain to neutralizing means.

---

This invention relates to a method, and particularly a continuous method, for acidulating soapstock and collecting the desired acid oil. The invention also relates to an apparatus for practicing the foregoing method.

Glyceride oils are conventionally refined by caustics such as potassium hydroxide or sodium carbonate to neutralize the free fatty acids which are present in the crude glyceride oils. It is recognized that such neutralization leads to the formation of what the art refers to as soapstock. Said soapstock is a mixture of various materials but, principally, alkaline metal or alkaline earth metal soaps of fatty acids; entrained or occluded glyceride oils; caustic; water; and color bodies.

The art has long recognized that soapstock is a raw material source of free fatty acids which has commercial value only when fatty acids can be practically and economically separated from the soapstock. The art has also recognized that strong mineral acids and heat may be used to hydrolyze the alkaline metal and alkaline earth metal soaps and glyceride oils in the soapstock to thereby provide forms of free fatty acids. The art has referred to this free fatty acid form in the acidulated soapstock as "acid oil" and the term "acid water" has been used to conveniently describe the ingredients other than the acid oil in said acidulated soapstock. The acid oil is lighter than the acid water and the art has separated these materials by centrifugation, for example. The various systems which the art has employed to collect acid oil involved various problems relating to handling and transferring of the acidulated mixture, the separation of the acid oil, neutralization and disposal of acid water and storage, and collection and storage of the acid oil. The well known use of centrifugation separates the heavier acid water from the acid oil, but this clearly requires the use of complicated and expensive equipment. It is evident that a method would be highly desirable which would allow more simple structures, equipment and means for separating the acid oil and acid water, as well as for neutralizing the acid water, handling wastes and, in general, transferring the various materials. It is also evident that it would be highly desirable to provide a continuous method which could be practiced with simpler structures, equipment and means whereby acid oil would be efficiently and continuously separated and collected while, at the same time, meeting the problem of handling and disposing of waste materials.

In addition to the desirability of using simpler structures, equipment and means for obtaining acid oil, it would be highly desirable to provide new process steps wherein the acidulation and collection of acid oils could be performed more efficiently.

It is accordingly one primary object of the present invention to provide a method wherein acid oil is obtained in an improved manner from acidulated soapstock.

Still another object of the invention is a method, particularly a continuous method, for efficiently separating and collecting acid oil from the acidulation of soapstock without requiring expensive or complex materials.

Still another object of the invention is a continuous method for obtaining acid oil from the acidulation of soapstock wherein more simple means are employed for continuously transferring a soapstock and acid mixture from an acidulator vessel to a settling basin, and transferring said acid oil from said settling basin to storage means; and wherein said transferring steps are effected by simple and efficient overflow.

Yet another object of the invention is to provide a continuous overall system which commences with delivering soapstock acid and water to an acidulator; and which is completed with depositing separated good quality acid oil in storage means and neutralizing and disposing acid water which is a commercially unimportant by-product in the process.

A still further object is an apparatus assembly in which soapstock may be continuously acidulated and acid oil may be continuously collected, while commercially undesirable by-products are neutralized and disposed.

Objects such as the foregoing are attained together with still other objects which will occur to practitioners by the invention which will be described and which is shown in the following drawing wherein a highly schematic flow diagram illustrates the method and an apparatus assembly of the invention.

The method of the invention provides that soapstock, water and a strong mineral acid are delivered at predetermined rates to a confined acidulator area which is substantially filled with the mixture. The level of the mixture within the area is maintained above an overflow outlet or port where, following acidulation upon the desired expiration of time and desired application of heat, the acidulated mixture is transferred as overflow volume into a confined settling area. In the settling area, the heavier water settles and the fatty acid oil rises. The acidulated mixture is delivered to the settling area at a rate to maintain the settling area substantially filled so that the level of the mixture therein is above an upper overflow outlet where the lighter fatty acid oil at a raised portion is continuously withdrawn through an overflow outlet into storage means. It is likewise provided, in the preferred embodiment, that the heavier waste acid water is drained from the substantially filled settling area into a confined neutralizing area which is maintained substantially filled with the waste acid water. Caustic agents such as alkaline metal hydroxides and alkaline earth metal hydroxides may then be continuously delivered to the confined neutralizing area to neutralize the acid water. In the preferred embodiment, the neutralized liquid in the neutralizing area is maintained at a sufficient volume so that its level is above an overflow outlet whereby the neutralized waste by-product is continuously discharged and then disposed to a sewer.

The foregoing provision of continuous overflow transport and transfer to confined areas, which are maintained substantially filled, results in the advantages of the improved practice of the present invention. It has been further found that the invention may be practiced to still further advantage by maintaining the pH of the acidulator area within a fairly narrow range of not less than 1.5 and not more than about 2. It has been found that a pH level of greater acidity than 1.5 does not improve performance and it leads to waste of acid, whereas a pH having an acidity less than about 2 tends to lead to objectionable foaming. In other words, a pH less than about 1.5 leads to acid waste, and a pH more than about 2 may lead to foaming. It is also a preferred practice of the invention to heat the mixture in the acidulator zone with steam which agitates the mixture as well as imparts heat thereto. In particular, it has been found advantageous to introduce the steam within a circular conduit or pipe disposed within the acidulator heaing vessel and providing apertures on the inside periphery of the pipe which apertures are disposed so that the steam is emitted in a tangential direction relative to the inside periphery of the circular pipe. This results in a swirling action which desirably agitates the mixture within the acidulator zone. Sufficient steam is introduced to maintain the temperature of the heated acidulator vessel as close to boiling as possible; namely, 212° F.

The embodiment best contemplated at present to practice the invention may be seen in the attached schematic diagram showing steps to practice a continuous method. The soapstock and water are delivered from a conventional caustic refining area 10 wherein conventional caustics have been added to crude glyceride oils to reduce the free fatty acid content and to degum certain glyceride oils. The soapstock from the caustic refining process is separated by conventional means such as centrifugation and, in the preferred practice, water is added to the centrifuge as a "bowl flush." The mixture of soapstock and bowl flush water is then delivered at a controlled rate through valve means 11 into conduit line 12. In general, water is present in a major amount in the soapstock and water combination. For example, soapstock may be delivered at a rate of 500 lbs. per hour and the wash water may be delivered at the rate of 5000 lbs. per hour into the line 12. The soapstock and water combination is delivered into an acidulator heating vessel 14.

A concentrated mineral acid such as sulphuric acid is delivered from a storage or reservoir 16 into line 18 at a predetermined rate which is controlled by operating valve 20. In this embodiment, the further delivery of the mineral acid is controlled by a feeder pump 22 which delivers this mineral acid at a predetermined rate into line 24 where it later mixes with the soapstock and water combination in line 12 before entry into the acidulator vessel 14. Because of the controlled rates of delivery and introduction of soapstock water and mineral acid into the acidulator vessel, the mixture of these materials within the vessel at any time is such that the pH range of the mixture is within the desired range of about 1.5 to about 2.

The acid soapstock and water is futrher delivered to the heating vessel at a rate to maintain the heated acidulator vessels substantially full so that the level of the mixture is above the overflow line indicated at 26. The mixture within the heated vessel is preferably heated by steam introduced by line 28 through operating valve 30. As stated, the steam line within the vessel preferably follows a circular path having a plurality of apertures tangentially communicating with the inside of the line along the inner periphery of the circular path so that the emitted steam follows a swirling action agitating the mixture as well as heating it. A temperature gauge or indicator 27 may be mounted on overflow line 26 to report the temperature.

Since the level of the acidulator mixture in vessel 14 is above the overflow 26, the acidulated mixture is continuously transferred to a settling basin 34. The acidulated mixture separates in the settling basin so that the heavier acid water settles towards the lower portions of the basin and the lighter acid oil or acidulated oil rises towards the upper portions of the basin. The acidulated mixture is delivered to the settling basin at predetermined rates so that a sufficient body of liquid is present to substantially fill the settling basin, and the separated acid oil assumes a position at a level which corresponds to the uppermost position overflow means, a plurality of which are shown at 36. It is preferred that the plurality of overflow means be provided so that the acid oil can be collected at several different levels, for example, at uppermost level 36a, intermediate level, 36b, and lowermost level 36c. Each of the overflow means may be provided with valves as shown and may be provided with ball float level switches of explosion proof construction so the individual overflow means may open and close in sequence.

The high quality acid oil which moves through the overflow means of settling basin 34 is transferred to various storage means. One such means employs the illustrated surge tank 38 which receives the acid oil from the conduit 40 communicating with the plurality of overflow means 36. A control sensing means 42 may be provided to start a pump 44 when the level of the acid oil in the surge tank attains a preselected level. The pump 44 will then deliver the acid oil to a storage means which is indicated at 46. The pump 44 may be an iron positive displacement pump which may be provided with an explosion-proof dry motor.

The acid water phase which separates in the settling basin 34 is preferably continuously drained off into line 48 and then transferred to a neutralizing tank 50. The acid water is neutralized in tank 50 by continuously delivering caustic solution along line 52 so that it may communicate with the acid oil in line 48 before entry into the neutralization tank. The caustic solution may be continuously delivered at a preselected rate by the same feeder pump 22 used for delivering the mineral acid to the heated acidulator vessel. The feeder pump 22 may be a dual head feeder to control the flow of both mineral acid and caustic; and the pump may have an explosion-proof dry motor. Conventional means may be used to communicate line 52 with line 54 which delivers a dilute caustic solution from tank 56. The caustic is diluted to a predetermined strength or concentration in tank 56 by utilizing a mixer 58 after receiving higher concentrated mixtures along lines 60 from caustic storage tank 62 and water along line 64 from water storage tank 66. The mixer may be a portable type mixer with a shaft and propeller agitator and, may be compressed-air driven. Valves 60a and 64a may be provided to control the flow of caustic and water, respectively, to the caustic tank; and valve 56a may also be provided for controlling the flow of the diluted caustic to the feeder pump 22. The present continuous method operates to advantage by providing about 25% dilute caustic solution in tank 56; and this desired concentration may be attained by delivering equal volumes of 50% caustic from the caustic tank 62 and water from water tank 66.

The level of the acid water and dilute caustic in neutralizing tank 50 is maintained so that it is above an overflow indicated at 68. The neutralized acid water is then discharged through the overflow line 68 to waste or sewer indicated at 70.

Conventional types of equipment may be used to set up the system and method in view of the materials and reagents which are expected to be stored and handled by such equipment. For example, dilute caustic tank 56, acidulator vessel 14, settling basin 34, acid oil surge tank 38 and neutralizing tank 50 will preferably be constructed of hardened carbon steel. Rectangular carbon steel tanks may be provided as for settling basin 34, acid oil surge tank 38 and neutralizing tank 50. Cone bottom, welded carbon steel tanks may be provided as for the acidulator heater vessel 14 and dilute caustic tank 56.

The system and continuous method described herein is practiced to advantage because more efficient and less expensive equipment and structures are employed, and also because the separation and collection of the acid oil is performed in an improved manner. The practice of the method permits high quality acid oil overflow to be collected from the settling basin 34. When acidulating degummed soybean soapstock for example, such an overflow may contain as little as 1% acid water and as high as 95–96 total fatty acids. Likewise, the acid water drained from settling base 34 into line 48 may contain as little as 0.03% acid oil therein.

The high quality of the collected acid oil will, of course, make subsequent refining for different particular uses a much more simple task. The acid oil overflow has a good clean appearance which confirms its high content of free fatty acids. On the other hand, the waste acid water is likewise very clean which supports the determination that the acid oil content is extremely low in the waste discharge.

The invention may now be practiced in the various ways which will occur to practitioners, and all such practice is intended to be a part of the present invention provided it comes within the terms of the following claims as given further meaning by the language of the preceding specification.

What is claimed is:

1. In the method of acidulating soapstock by combining a strong mineral acid with soapstock and then heating and agitating the mixture, the improved method of collecting acid oil which includes the steps of:
    maintaining the pH of the mixture from less than about 1.5 to no more than about 2,
    transferring a charge of the acidulated mixture after substantial completion of acidulation to a settling area, transferring a sufficient volume of said acidulated mixture so as to exceed an overflow level in said settling area, said acidulated mixture separating in said settling area by the acid oil raising to above the overflow level and the acid water settling to a lower level, and
    decanting and collecting the acid oil by withdrawing the acid oil at the overflow level in said settling area.

2. A method as in claim 1 wherein strong mineral acid water and soapstock are delivered to a confined acidulator area where the mixture is heated, and wherein said mixture is delivered in a sufficient volume so that it rises above an overflow level in said confined acidulator area, whereby said acidulated mixture may be directed through said overflow area to the confined settling area.

3. A method as in claim 1 wherein said acid oil overflow level includes a plurality of outlets so that the acid oil may be decanted and collected at selective levels in the overflow portion.

4. A method as in claim 1 which further includes draining off the acid water from the settling area from a lower drain so that the volume of the acidulated mixture within the settling area is reduced to permit additional volumes of said acidulated mixture to be introduced therein.

5. A method as in claim 4 which further includes transferring the acid water into a neutralizing area, and introducing a caustic agent to neutralize the acid water therein.

6. A method as in claim 5 which further includes transferring a sufficient volume of acid water to the neutralizing area so that the volume rises above an overflow means in said neutralizing area, whereupon neutralized water is conveyed out of the neutralizing zone through said overflow.

7. A method as in claim 1 wherein said mixture of soapstock, mineral acid, and water is continuously acidulated, and wherein said acid oil is continuously collected, which further includes the steps of:
    continuously delivering preselected amounts of soapstock, water and mineral acid to a confined acidulator area, said mixture being delivered at a rate to maintain the confined area substantially full so that said mixture level in the acidulator area is above an upper overflow in the acidulator area,
    continuously directing the overflow acidulated mixture to a confined settling area, said overflow acidulated mixture being directed at a rate to maintain the confined settling area substantially full so that the level of the acidulated mixture in the settling area is above an upper overflow in said settling area,
    continuously decanting and collecting the acid oil overflow, and
    continuously draining off the acid water from said confined settling area.

8. A method as in claim 7 which further includes the step of continuously delivering caustic to the confined neutralizing zone in a sufficient volume so that the volume of the caustic, together with the volume of acid water continuously drained into the neutralizing area, is sufficient to substantially fill said neutralizing area so that the level of said neutralized mixture within said area is above an overflow, and
    continuously discharging the overflow to waste disposal.

9. A method as in claim 8 which further includes the steps of:
    selectively decanting the acid oil from the confined settling area through a plurality of upper overflow levels,
    transferring said acid oil to a confined surge area in volumes sufficient to substantially fill said acid oil surge area, and
    continuously moving volumes of acid oil from the substantially filled acid oil surge area to an acid oil storage zone.

10. A method as in claim 9 wherein soapstock is continuously delivered to the acidulator confined area from a caustic refining area wherein said soapstock is separated by centrifugation, and said water is continuously delivered to the confined acidulator area as bowl flush water from the caustic refining area, said bowl flush water added to the caustic refining area after centrifugation, and further including:
    delivering said mineral acid as concentrated mineral acid to said confined acidulator area, and
    delivering said soapstock, bowl flush water, and concentrated mineral acid at predetermined and controlled rates so that the mixture within the confined acidulator area is maintained at the pH rate of more than about 1.5 and less than about 2.

11. An apparatus assembly to continuously acidulate soapstock, to collect acid oil, and to neutralize acid water which includes:
    an acidulator heating vessel, an upper overflow port in said heating vessel,
    pumping means to deliver mineral acid at a predetermined rate into said heating vessel,
    means to deliver soapstock and water at predetermined rates into said heating vessel so that the mixture of soapstock, water, and mineral acid is present in predetermined proportions within said acidulator heating vessel,
    a confined settling basin, conduit means communicating the heating vessel in the settling basin so that the acidulated mixture may be continuously conveyed from the heated vessel overflow means into said settling basin,
    upper overflow means in said settling basin to continuously decant the separated acid oil, a lower drain port in said settling basin to continuously drain off the settled acid water, conduit means to convey the overflow acid oil to storage means, and conduit means to convey the drained acid water away from the settling basin.

12. An apparatus as in claim 11 which further includes:

a neutralizing tank to receive the drained acid water from the settling basin, said neutralizing tank having an upper overflow, pumping means to deliver caustic agent to the neutralizing tank, a communicating conduit to convey said caustic from said pumping means to said neutralizing tank, and a discharge conduit to convey the neutralized acid water from the overflow means to disposal.

13. An apparatus as in preceding claim 12 which further includes:

an acid oil surge tank, a communicating line between the settling basin overflow means and the acid oil surge tank, and control means to actuate pumping means for withdrawing the acid oil from the surge tank at preset levels within said tank to acid oil storage means.

References Cited

UNITED STATES PATENTS

| | | | |
|---|---|---|---|
| 2,663,719 | 12/1953 | Ayres | 260—425 |
| 2,759,957 | 8/1956 | Thurman | 260—425 |
| 2,970,910 | 2/1961 | Thurman | 260—425 X |

MICHAEL E. ROGERS, *Primary Examiner.*

U.S. Cl. X.R.

23—260; 210—205; 260—425